UNITED STATES PATENT OFFICE.

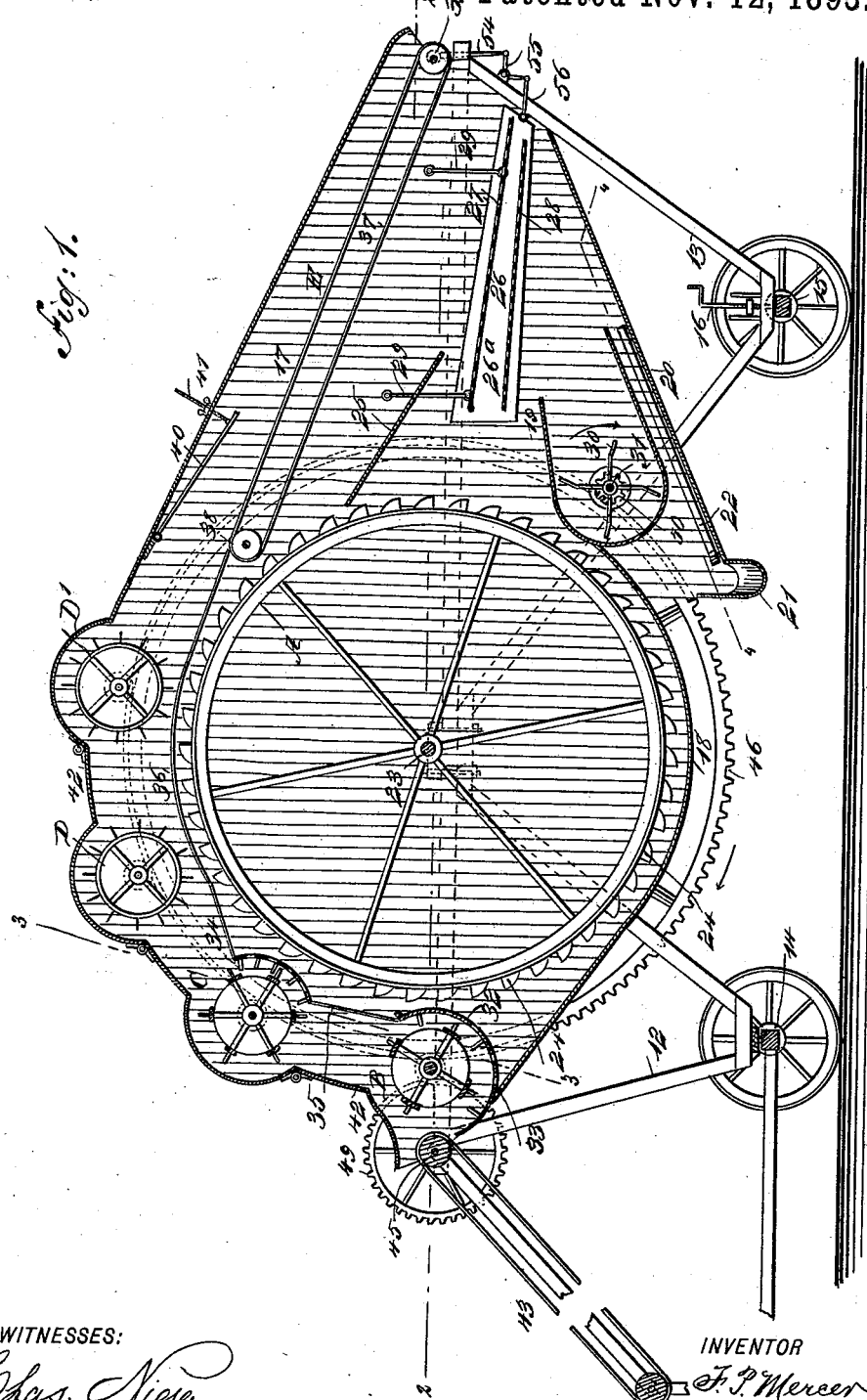

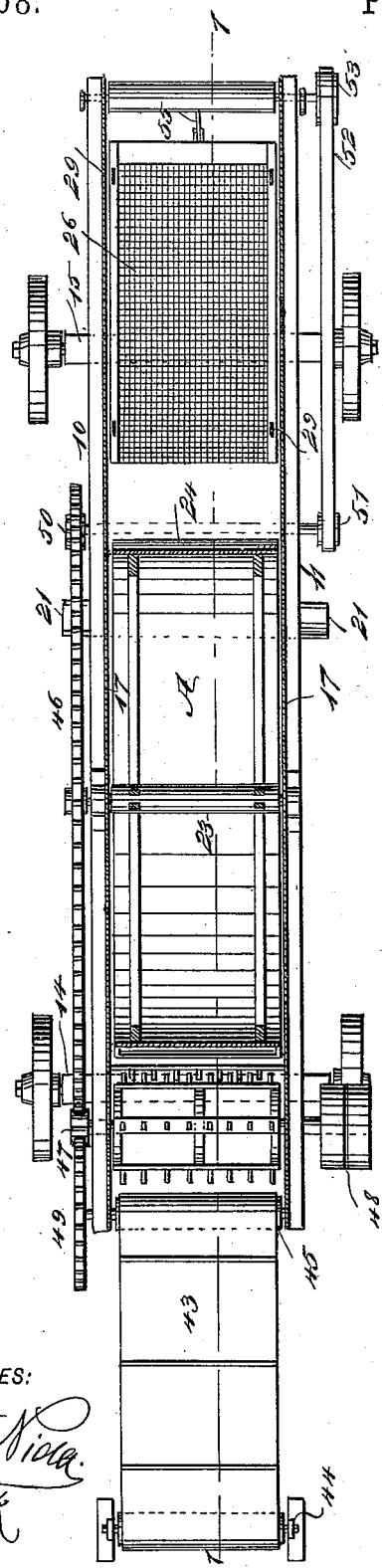

FRANKLIN P. MERCER, OF CONWAY SPRINGS, KANSAS.

THRASHING-MACHINE.

SPECIFICATION forming part of Letters Patent No. 549,808, dated November 12, 1895.

Application filed March 15, 1895. Serial No. 541,895. (No model.)

*To all whom it may concern:*

Be it known that I, FRANKLIN P. MERCER, of Conway Springs, in the county of Sumner and State of Kansas, have invented a new and Improved Thrashing-Machine, of which the following is a full, clear, and exact description.

My invention relates to an improvement in thrashing-machines; and it has for its object to provide a machine of exceedingly simple and durable construction whereby the grain will be thrashed in an expeditious and convenient manner and delivered to an elevator which will convey it to a riddle, the grain passing through the riddle in the presence of an airblast to an exit at either side of the machine, as may be desired, the straw finding an exit at one end of the machine, the exit for the straw being removed from possible interference with the riddle or exit for the grain.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a central longitudinal and vertical section through the machine, taken practically on the line 1 1 of Fig. 2. Fig. 2 is a horizontal section, taken longitudinally about centrally through the machine, practically on the line 2 2 of Fig. 1. Fig. 3 is a transverse section taken, essentially, on the line 3 3 of Fig. 1; and Fig. 4 is a horizontal section illustrating the exit for the grain, the section being taken on the line 4 4 of Fig. 1.

In carrying out the invention the frame of the machine consists, preferably, of two side beams 10 and 11, which may be of angle-iron, two angular trusses 12 and 13, which likewise may be made of angle-iron, supporting each side beam 10 and 11; the said trusses being made to rest upon wheel-supported axles 14 and 15, the rear trusses 13 being made to rest upon the rear axles 15, and the said rear trusses may be raised or lowered through the medium of lifting-screws 16 of any approved construction, as shown in Fig. 1, whereby the rear end of the machine may be elevated or depressed, as occasion may require. Thus it will be observed that the frame of the machine is virtually mounted upon a truck, and the machine may be readily drawn from place to place.

In addition to the framing above described, a casing 17 is employed, attached to the side beams and trusses of the framing, the sides of the casing being connected at the top. The forward upper portion of the casing is made more or less cylindrical, while the upper rear portion is given usually a downward inclination. The under forward bottom portion 18 of the casing is likewise made more or less cylindrical, its convexed surface facing downward; and the said cylindrical bottom portion 18 is made to extend at its rear end inward to meet a fan-casing 19, located within the main casing and extending from side to side thereof, while below the fan-casing the rear section 20 of the bottom is given a downward inclination from the rear end of the machine in direction of the center, terminating at its lower end in a trough 21, which extends beyond both of the outer side faces of the main framing.

The rear section 20 of the bottom forms virtually a chute, as shown in Fig. 4, adapted to receive the riddled grain and conduct it to the trough 21, the grain being delivered through said trough to either side of the machine by pivoting a spacing-arm 22 to the lower central portion of the chute 20, as shown in Fig. 4, adjacent to the trough, and by carrying said arm to a contact with the right-hand side of the chute the grain will be forced to pass out from the left-hand end of the trough, it being understood that the trough is inclined in opposite directions from its center.

A drum or wheel A, of suitable peripheral width, is mounted upon a shaft 23, which shaft is journaled in the casing at or near the central portion thereof, the boxes for the shaft being made to rest upon the side beams 10 and 11 of the framing, as shown in Fig. 2. This drum is located between the upper cylindrical portion of the casing and the forward cylindrical section 18 thereof, being nearer the latter than the former, and the periphery of the said drum or wheel is provided with series of buckets 24 or equivalent receptacles, firmly attached thereto. These buckets are adapted to receive the thrashed grain and deliver said grain upon a downwardly-inclined table 25, located at the rear of the wheel or drum and extending practically from side to side of the casing, which table delivers the grain upon a riddle 26. The riddle 26 is adapted to have laterally-reciprocating movement within the casing of the thrasher over the chute 20, and it consists of a frame 26ª, carrying two sieves 27 and 28, one below the other, the sieves being preferably of different mesh, and the material which cannot pass through either of the sieves will find an exit at the rear of the machine, which is open. The frame 26ª of the riddle is supported by links 29, which are pivotally attached to the inner faces of the sides of the casing. A fan 30, of any approved construction, is located in the fan-casing 19 and secured upon a shaft 31, journaled usually in bearings located upon the rear trusses 13 of the frame, and when the machine is in operation the grain in passing from the riddle to the chute 20 will be subjected to the action of the blast created by the fan and all light material will be blown from the grain out through the rear end of the casing. In this form of thrasher virtually two thrashing-cylinders B and C are employed, one of the thrashing-cylinders being journaled in suitable bearings opposite the mouth or front open end of the framing, as shown in Fig. 1, and the concave 32 of this cylinder is provided with an opening 33, through which the grain may pass to the cylindrical forward bottom section 18 of the casing, whereupon, as the drum or wheel A is revolved its buckets will receive this grain and carry it upward to be delivered to the table 25.

The concave 34 of the second cylinder C is connected with the concave of the lower cylinder B through the medium of bars 35, located at predetermined intervals apart and forming a grating. The cylinder C is located above the cylinder B, their arrangement being concentric with the axis of the hoisting-drum A. The cylinder B and its concave are so constructed—that is, are provided with teeth of such character and so located—that the action of the said lower cylinder and concave will be to break the bundles of straw delivered into the mouth of the casing and scatter the same, and the straw will then be passed upward by the action of the cylinder to the next upper cylinder C, which is in every sense a thrashing-cylinder, acting in conjunction with its concave 34 to thoroughly thrash out the grain.

Two or more beating-cylinders D and D' are located over the upper portion of the elevating-drum, and the said beating-cylinders or beaters are arranged likewise concentric with the axis of the elevating-drum. A grating 36, constructed likewise of spaced bars, is made to extend from the upper concave 34 over the upper portion of the elevating-drum and below the beaters to a point slightly at the rear of the said drum, yet above it, the grating 36 being adapted to deliver the straw from which the grain has been thrashed to a straw-carrier E. The said carrier consists of a belt 37, which is downwardly inclined and made to pass over two rollers 38 and 39, one of which is journaled in the casing immediately below the rear end of the upper grating 36, and the other roller at the rear open end of the casing, near the top. The rapidity of the descent of the straw on the carrier is governed by a plate 40, which is pivoted to the inner upper portion of the cylinder at one end and is held at its opposite end over the straw-carrier and at a predetermined distance therefrom by an attached set-screw 41 passed through the top of the casing and provided with a suitable nut or the equivalent thereof.

It will be understood that the top and front of the casing over or adjacent to the beaters or thrashing-cylinders are made more or less dome-shaped, and the material of the casing between these dome-shaped projections is hinged to form doors 42, whereby the interior of the machine may be rendered visible at any time.

The usual feed-apron 43 is located at the front of the machine, being made to pass over a lower drum 44 and over an upper drum 45, journaled in the mouth of the machine, whereby the bundles will be delivered directly to the first cylinder B.

The driving mechanism may be substantially as follows: A large gear-wheel 46 is secured upon the shaft 23 of the drum A, and the said wheel is made to mesh with a pinion 47, located upon one end of the shaft carrying the lower cylinder B, the opposite end of the said shaft being provided with pulleys 48, to which the power is applied. The feed-apron 43 is driven by means of a gear 49, secured to the trunnions of its upper drum 45 and meshing with the pinion 47. The shaft of each beater, and likewise the upper thrashing-cylinder C, is provided with a pinion, and the several pinions are made to mesh with the teeth of the large or master wheel 46, as shown in Fig. 1. The fan-shaft 31 is driven in like manner by securing upon one of its ends a pinion 50, which meshes with the teeth of the master-wheel. The opposite end of this shaft is provided with a pulley 51, and the said pulley is connected by a belt 52 with a pulley 53, located upon one end of the lower drum 39 of the straw-carrier, thus driving the same, and through the medium of the shaft of this lower drum 39 motion is communicated to the riddle 26, and this is accomplished by attaching to said shaft a link-eccentric 54 and pivotally connecting the said link-eccentric with an angle-lever 55, which lever is also connected by a link 56 with the riddle; but other means may be employed for reciprocating the riddle if in practice it is found desirable.

It will be understood that the riddle may empty its unsifted contents into a return-chute connected with the lower cylinder, and that the straw may be carried a second time to this cylinder, if found necessary.

I further desire it to be understood that any number of the thrashing-cylinders and beaters may be used in connection with the elevator, and they may be grouped in any desired manner.

It will be further understood that the cylinders may be driven otherwise than in the manner shown in the drawings—as, for example, the second or rear cylinder may be driven by a short belt from the first cylinder, a strong belt-tightener being used in connection with the belt.

Having thus described my invention, I claim as new and desire to secure by Letters Patent—

1. In a thrasher, the combination with a frame, of a thrashing cylinder, a concave operating therewith, the said concave being perforated to permit the passage of grain, a drum elevator capable of elevating the grain which passes through the perforations in the concave, a separator screen upon which the drum deposits the grain, said separator screen being located on the opposite side of the drum, a bridge extending over the elevator drum and capable of having the straw passed over it, and an endless carrier at the end of the bridge for taking up all the straw and conducting it to the exit opening of the frame, substantially as described.

2. In a thrashing machine, the combination with a frame, of a thrashing cylinder, a concave operating therewith and being perforated to permit the passage of grain, a drum elevator capable of moving the grain which passes said perforations, a separating screen upon which the drum deposits the grain, a bridge extending from the thrashing cylinder upwardly and rearwardly over the elevating drum, a series of successively arranged spiked cylinders mounted above a bridge and capable of taking the straw from the thrashing cylinder to the end of the bridge, and an endless carrier at the end of the bridge for continuing the conducting of the straw, substantially as described.

FRANKLIN P. MERCER.

Witnesses:
E. L. CLINE,
W. J. KREBS.